US00RE38763E

(19) United States
(12) Reissued Patent
Trizzino et al.

(10) Patent Number: US RE38,763 E
(45) Date of Reissued Patent: Jul. 26, 2005

(54) EMERGENCY VEHICLE WARNING SYSTEM AND METHOD

(75) Inventors: Christopher Trizzino, Mayfield Hts., OH (US); Thomas S. Florian, Willoughby, OH (US); Karen M. Kickel, Bainbridge, OH (US); Susan Trizzino, Mayfield Hts., OH (US)

(73) Assignee: Trianco, Inc., Mayfield Heights, OH (US)

(21) Appl. No.: 09/577,031

(22) Filed: May 23, 2000

Related U.S. Patent Documents

Reissue of:
(64) Patent No.: 5,757,284
Issued: May 26, 1998
Appl. No.: 08/469,683
Filed: Jun. 6, 1995

(51) Int. Cl.[7] ..... G08G 1/00
(52) U.S. Cl. ..... 340/902; 340/903; 340/904; 340/825.36
(58) Field of Search ..... 340/901, 902, 340/903, 904, 905, 825.36; 342/450, 455, 457

(56) References Cited

U.S. PATENT DOCUMENTS

| | | | | | |
|---|---|---|---|---|---|
| 3,257,641 | A | * | 6/1966 | Campana et al. | 340/906 |
| 3,854,119 | A | * | 12/1974 | Friedman et al. | 340/902 |
| 3,984,807 | A | * | 10/1976 | Haemmig | 340/991 |
| 4,083,003 | A | * | 4/1978 | Haemmig | 375/259 |
| 4,296,496 | A | * | 10/1981 | Sadler | 340/901 |
| 4,747,064 | A | * | 5/1988 | Johnston | 340/902 |
| 4,908,629 | A | * | 3/1990 | Apsell et al. | 342/457 |
| 4,914,434 | A | * | 4/1990 | Morgan et al. | 340/906 |
| 5,235,316 | A | * | 8/1993 | Qualizza | 340/436 |
| 5,235,329 | A | * | 8/1993 | Jackson | 340/902 |
| 5,281,947 | A | * | 1/1994 | Durley et al. | 340/433 |
| 5,281,949 | A | * | 1/1994 | Durley et al. | 340/433 |
| 5,286,099 | A | * | 2/1994 | Fujita et al. | 303/103 |
| 5,289,181 | A | * | 2/1994 | Watanabe et al. | 340/902 |
| 5,289,182 | A | * | 2/1994 | Brillard et al. | 340/902 |
| 5,339,075 | A | * | 8/1994 | Abst | 340/903 |
| 5,369,591 | A | * | 11/1994 | Broxmeyer | 340/903 |
| 5,497,148 | A | * | 3/1996 | Oliva | 340/902 |

OTHER PUBLICATIONS

Safety Warning System Newsletter dated Feb. 1995.*
Safety Warning System Newsletter dated Mar./Apr. 1995.*
RADAR Report dated Sep. 1995.*

* cited by examiner

*Primary Examiner*—Daniel J. Wu
(74) *Attorney, Agent, or Firm*—John H. Vynalek; James A. Hudak

(57) ABSTRACT

A system and method for altering a driver of a motor vehicle of the approach of an emergency vehicle in an emergency state, comprising a transmitter in the emergency vehicle which produces and transmits a radio frequency signal having a unique audio encoded data signature modulated thereon when the emergency vehicle is in an emergency status, a receiver in motor vehicle which receives the radio frequency signal, demodulates and decodes the radio frequency signal and produces a voltage output when the data signature is present; and an alarm producing device which produces an alarm in response to the voltage output warning the driver of the motor vehicle of the approach of the emergency vehicle.

7 Claims, 2 Drawing Sheets

EMERGENCY VEHICLE WARNING SYSTEM AND METHOD

Matter enclosed in heavy brackets [ ] appears in the original patent but forms no part of this reissue specification; matter printed in italics indicates the additions made by reissue.

BACKGROUND OF THE INVENTION

The present invention relates generally to an emergency vehicle warning system and method and, more particularly, to an emergency vehicle warning system and method utilizing a radio frequency communication link.

Emergency vehicles, such as police patrol cars, ambulances and fire engines, when in an emergency state, travel at a high rate of speed and usually, do so through crowded streets and roadways. The law requires that other motor vehicles immediately give the right-of-way to the emergency vehicle. The driver of the motor vehicle, then, must be aware of the approach of the emergency vehicle within a suitable time to safely allow this right-of-way. In order to alert drivers of motor vehicles the approach of an emergency vehicle in an emergency status, the emergency vehicle relies on sight and sound; eg. flashing lights, sirens and horns.

These methods for alerting drivers to the approach of an emergency vehicle are becoming less effective. Advancements in automobile sound proofing and dampening have diminished the amount of external sound intruding into the passenger compartment of an automobile. Combining those advancements with the increased use of cellular car phones and more powerful car stereo systems employing tape decks and CD's, as well as radios, results in a driver being less aware of a siren or horn of an emergency vehicle. Although automobile design advancements have not impaired the driver's vision, the driver must be looking in the emergency vehicle's general direction to be able to see its flashing lights to become aware that it is an emergency state. This would not necessarily occur in the case of a emergency vehicle located behind, and traveling in the same direction of, a motor vehicle. This is also the case of an emergency vehicle approaching an intersection where the cross traffic approaching that intersection can neither hear not see the emergency vehicle. Without an effective way of communicating the approach of an emergency vehicle in an emergency state there is a heightened risk of collisions and therefore, the safety of the emergency vehicle and its occupants along with other motor vehicles and their occupants is jeopardized.

Previous efforts involving emergency vehicles focused on traffic signal preemption or vehicle location. U.S. Pat. No. 4,914,434 issued to Rodney K. Morgan and Bradley K. Cross on Apr. 3, 1990 teaches a system for transmitting a series of UHF spaced apart messages. The emergency vehicle transmits the signal to preempt the normal operation of traffic signals. This patent was an improvement over prior patents teaching traffic signal preemption devices utilizing radio and optical transmitters. U.S. Pat. No. 3,984,807 issued to Adrian B. Haemmig on Oct. 5, 1976 teaches a system for locating emergency vehicles utilizing a plurality of wayside stations each having a radio transmitter with a unique geographical coding. As the emergency vehicle passes such a station a signal is transmitted to a home base or headquarters advising of the whereabouts of the emergency vehicle.

Patents teaching vehicle collision avoidance systems or devices are based on ultrasonic transmitters (U.S. Pat. No. 5,339,075 issued to Terrill Abst on Aug. 16, 1994 and U.S. Pat. No. 5,235,316 issued to Gregory K. Qualizza on Aug. 10, 1993), permanent magnets embedded in a highway (U.S. Pat. No. 5,369,591 issued to Charles Broxmeyer on Nov. 29, 1994) and road surface friction detectors (U.S. Pat. No. 5,286,099 issued to Yasuhiko Fujita, Toshiaki Arai and Makoto Sato on Feb. 15, 1994. U.S. Pat. No. 5,281,947 issued to Clarence W. Durley and Jerry A. Robinson on Jan. 25, 1994 teaches a vehicle safety sensor and warning system employing Microwave Doppler Radar Shift Technology to detect personnel within a predetermined proximity.

These patents, while generally teaching a system for locating a vehicle or avoiding a collision between vehicles and accidents involving people, do not address or resolve the problem of adequately advising a driver of a motor vehicle of the approach of an emergency vehicle when it is an emergency state to allow the driver to give it the right-of-way and, thereby, assuring its safe and expedient passage while, at the same time, assuring the safety of other motor vehicles in or crossing the emergency vehicle's path.

Accordingly, a need exists for a system to advise the driver of a motor vehicle of the approach of an emergency vehicle in an emergency state in addition to the traditional methods of sight and sound.

SUMMARY OF THE INVENTION

The present invention provides a system to satisfy the aforementioned need.

Accordingly, the present invention is directed to a system for alerting a driver of a motor vehicle of the approach of an emergency vehicle in an emergency status, comprising an emergency vehicle with transmitting means therein which produces and transmits a radio frequency signal with a certain range and has a unique audio encoded data signature modulated thereon when the emergency vehicle is in an emergency status. The system also comprises a motor vehicle within the range of the radio frequency signal having receiving means which receives the radio frequency signal, demodulates and decodes it and produces a voltage output when the unique audio encoded data signature is present. The system also comprises alarm producing means which produces an alarm in response to the voltage output warning the driver of said motor vehicle of the approach of said emergency vehicle.

In another aspect, the invention is directed to a method for alerting a driver of a motor vehicle of the approach of an emergency vehicle in an emergency status, comprising the steps of: providing an emergency vehicle equipped with transmitting means therein, transmitting from the emergency vehicle a radio frequency signal with a certain range and having a unique audio encoded data signature modulated thereon when the emergency vehicle is in an emergency status, providing a motor vehicle within the range of the radio frequency signal and having receiving means and alarm producing means therein, receiving the radio frequency signal by the receiving means in the motor vehicle, demodulating the radio frequency signal, decoding the radio frequency signal, producing a voltage output when the unique audio encoded data signature is detected, and producing an alarm in response to the voltage output warning the driver of the motor vehicle of the approach of said emergency vehicle.

BRIEF DESCRIPTION OF THE DRAWINGS

Further features of the present invention will become apparent to those skilled in the art to which the present invention relates from reading the following specification with reference to the accompanying drawings in which.

DESCRIPTION OF THE PREFERRED EMBODIMENT

Figure 1:
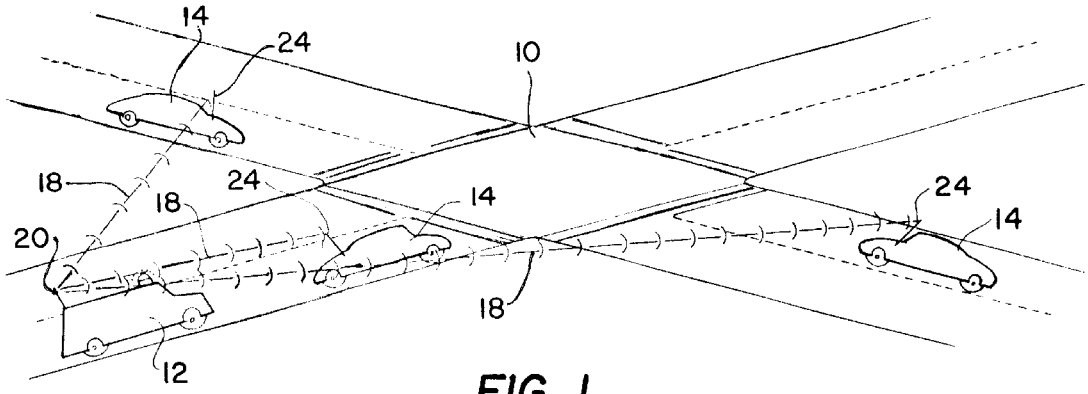
FIG. 1 is a perspective view of a roadway grid with an emergency vehicle and other motor vehicles thereon illustrating the use of the system of the invention.

Referring now to the drawings and, more particularly, FIG. 1, there is shown a roadway grid 10 with an emergency vehicle 12 and other motor vehicles 14 located thereon. The emergency vehicle 12 is equipped with transmitting means 16 (not shown in FIG. 1) which produces and transmits a radio frequency signal 18 having a unique audio encoded data signature modulated thereon when the emergency vehicle 12 is an emergency status. The transmitting means 16 broadcasts the radio frequency signal 18 using a directional radiator 20. The motor vehicles 14 each have a receiving means 22 (not shown in FIG. 1). When the motor vehicle 14 is within the range of the radio frequency signal 18, the receiving means 22 in that particular motor vehicle 14 receives the radio frequency signal 18 from the emergency vehicle 12 using an omni-directional antenna 24, demodulates and decodes the radio frequency signal 18 and causes alarm producing means 26 (not shown in FIG. 1) to produce an alarm to warn the driver of the motor vehicle 14 of the approach of an emergency vehicle 12 in an emergency status. The driver of the motor vehicle 14, upon being warned of the approach of an emergency vehicle 12, then has sufficient time to move the motor vehicle 14 to give the emergency vehicle 12 the right-of-way. The radio frequency signal 18 can be any suitable frequency but, advantageously, is at least about 780 MHz. The radio frequency signal range is at most about 3500 feet.

Figure 2:
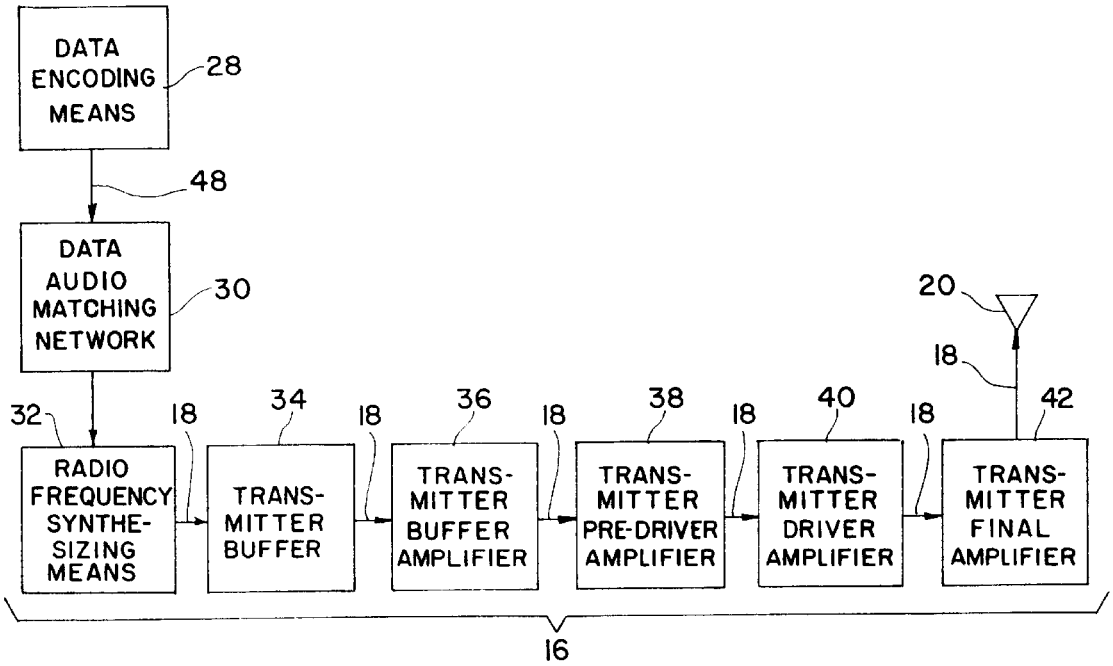
FIG. 2 is a block diagram of the transmitting means located in the emergency vehicle.

Referring now to FIG. 2 there is shown a block diagram of the transmitting means 16 of the present invention. The data encoding means 28 produces a specifically coded data audio output 48 when power is applied to it. The encoding performed by the data encoding means 28 creates a unique signature that causes the receiving means 22 (not shown in FIG. 2) to react only to a transmitted signal with that signature. The data audio matching network 30 insures impedance and audio level matching between the data encoding means 28 and the radio frequency synthesizing means 32. The radio frequency synthesizing means 32 generates the radio frequency signal 18 and applies the specifically coded data audio output 48 to it such that a unique audio encoded data signature is modulated thereon. Advantageously, the radio frequency synthesizing means 32 is a phase-locked-loop type having a voltage controlled oscillator, but can be crystal/oscillator/multiplier type. The transmitter buffer 34 assures proper impedance matching between the radio frequency synthesizing means 32 and the transmitter buffer amplifier 36. Amplification means comprising a transmitter buffer amplifier 36, transmitter predriver amplifier 38, transmitter driver amplifier 40 and transmitter final amplifier 42 each, in turn, increase the gain of the radio frequency signal 18 and provide impedance matching. The transmitter final amplifier 42 increases the gain of the radio frequency signal 18 to a sufficient level to overcome any radio frequency losses that may occur in the matching network means 44 and still be able to be broadcasted by the directional radiator 20. The matching network means 44 provides impedance matching between the transmitter final amplifier 42 and the directional radiator 20. The low pass filter circuit 46 provides adequate attenuation of any spurious frequency outputs and minimizes transmitter harmonics to acceptable government standards before the radio frequency signal 18 is applied to the directional radiator 20.

Figure 3:
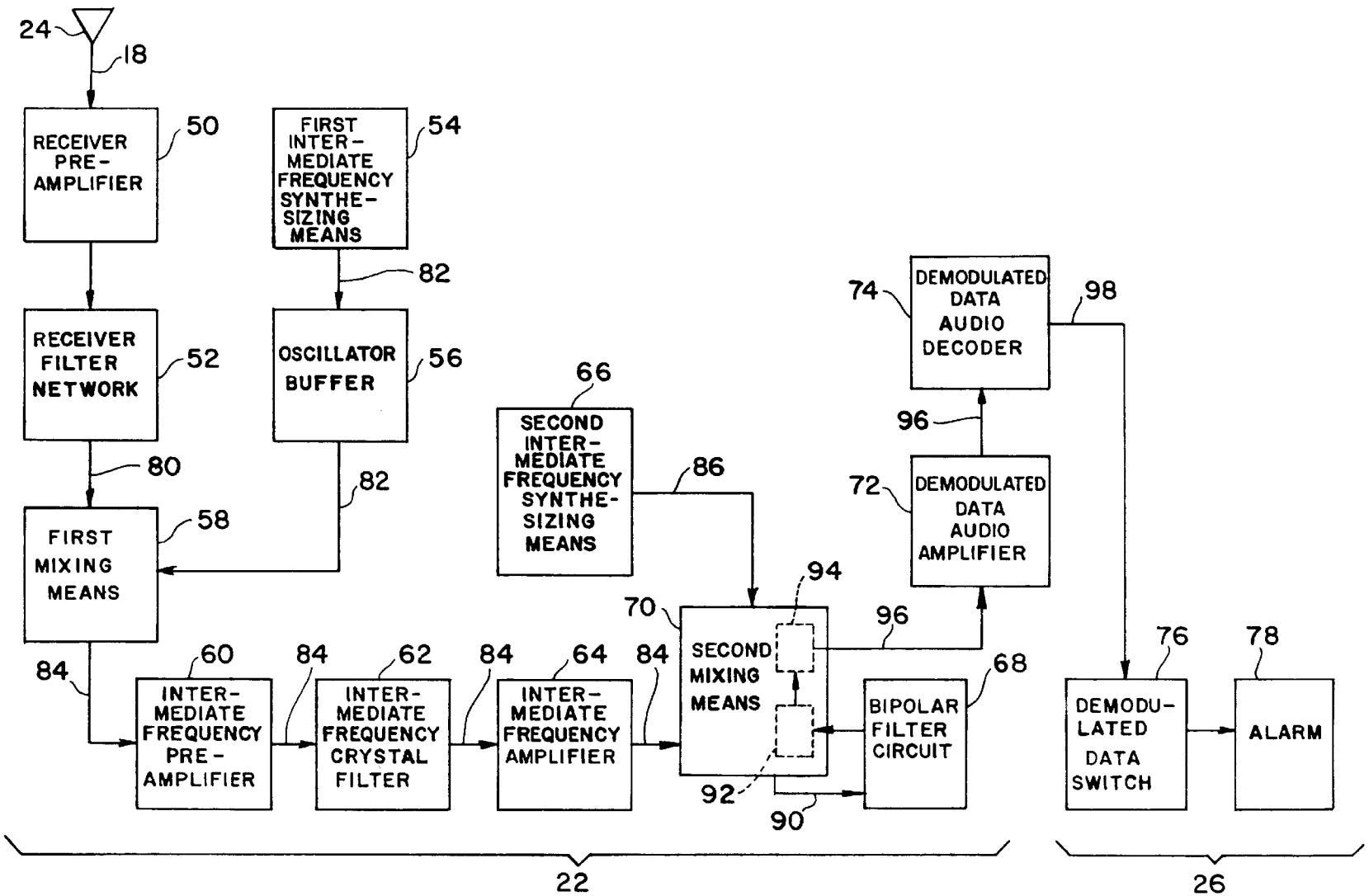
FIG. 3 is a block diagram of the receiving means and alarm producing means located in a motor vehicle.

Referring now to FIG. 3, there is shown a block diagram of the receiving means 22 and alarm producing means 26 of the present invention. The omni-directional antenna 24 receives the radio frequency signal 18 transmitted by the transmitting means 16. A receiver preamplifier means 50 has a bandpass filter circuit that removes any spurious signals from the radio frequency signal 18, a pre-selector filter circuit tuned to the frequency of said radio frequency signal 18 and an amplifier circuit to amplify the radio frequency signal 18. An image filter network 52 is an image rejection circuit which is used to eliminate any similar image frequencies that may be generated. The output of the image filter network 52 is a conditioned radio frequency signal 80.

First intermediate frequency synthesizing means 54 generates a first mixing signal 82. An oscillator buffer 56 amplifies the first mixing signal 82 and provides impedance matching with a first mixing means 58. The first mixing means 58 mixes the conditioned radio frequency signal 80 with the first mixing signal 82 resulting in a first intermediate frequency signal 84. Intermediate frequency preamplifier 60 increases the gain of the first intermediate frequency signal 84 and provides a high impedance output. The intermediate frequency crystal filter 62 filters the first intermediate frequency signal 84 to eliminate all but one of the four frequencies produced at the output of the first mixing means 58. A intermediate frequency amplifier 64 increases the gain of the first intermediate frequency signal 84 to a usable level of approximately +5 dbm to overcome any losses that may have occurred in the intermediate frequency crystal filter 62. The intermediate frequency amplifier 64 also provides impedance matching.

Second intermediate frequency synthesizing means 66 has a crystal controlled oscillator which generates a second mixing signal 86. The second intermediate frequency synthesizing means 66 operates similarly to the first intermediate frequency synthesizing means 54 but at a lower frequency. Second mixing means 70 mixes the second mixing signal 86 with first intermediate frequency signal 84 and results in a second intermediate frequency signal 90, advantageously, at a frequency of 455 KHz. A bipolar filter circuit 68 filters the second intermediate frequency signal 90. The second mixing means 70 operates similarly to the first mixing means 58 but at a considerably lower frequency based on the frequency of the second intermediate frequency synthesizing means 66. The bipolar filter circuit 68 contains a crystal filter which filters the second intermediate frequency signal 90 to eliminate all but one of the four frequencies produced at the output of the second mixing means 70 but is broad enough to pass a modulated radio frequency of 455 KHz. This allows for the modulation changes and possible slight frequency drifts that are encountered. The second mixing means 70 has a limiter circuit 92 that provides gain uniformity and amplification and a discriminator circuit 94 that removes the modulated data information from the second intermediate frequency signal 90 and converts it into demodulated data audio output 96. The demodulated data audio output 96 is an exact audio replica (with the exception of audio level) of the coded data audio output 48 of the transmitting means 16.

A demodulated data audio amplifier 72 amplifies the demodulated data audio output 96 and includes an impedance matching circuit which provides a proper match between the second mixing means 70 and a demodulated data audio decoder 74. The demodulated data audio decoder 74 decodes the demodulated audio output 96 and, if it detects the unique signature originally encoded by the data encoding means 28 of the transmitting means 16, produces a voltage output 98.

Alarm producing means 26 has a demodulated data switch 76 which responds to the voltage output 98 and activates alarm 78 alerting the driver of the motor vehicle 14 of the approach of an emergency vehicle 12 in an emergency state. The alarm 78 can be incorporated into the motor vehicle's radio which would turn down, or turn off, the radio when the voltage output 98 is produced.

Now that the invention has been described, variations and modifications will become apparent to those skilled in the art. It is intended that such variations and modifications be encompassed within the scope of the appended claims.

What is claimed is:

1. A *radio frequency transmission* system [for alerting a driver of a motor vehicle of the approach of an emergency vehicle is an emergency status,] comprising:

[a) an emergency vehicle;]

[b)] *a*) transmitting means [within said emergency vehicle, said transmitting means] having data encoding means which produces a specifically coded data audio output, radio frequency synthesizing means whereby a radio frequency signal having a certain frequency is generated and whereby said specifically coded data audio output is applied to said radio frequency signal such that said unique audio encoded data signature is modulated thereon [when said emergency vehicle is in an emergency state,] amplifying means whereby the gain of said radio frequency signal is increased and impedance matching provided, a low pass filter circuit whereby any spurious frequency outputs are attenuated and transmitter harmonics minimized to acceptable government standards, and a directional radiator such that said transmitting means broadcasts said radio frequency signal within a certain range;

[c) a motor vehicle within said certain range of said radio frequency signal;]

[d)] *b*) receiving means [in said motor vehicle] having an omni-directional antenna which receives said radio frequency signal from said transmitting means, a receiver preamplifier means which removes any spurious signals from said radio frequency signal and amplifies it, an image filter network which eliminates any similar image frequencies and resulting in a conditioned radio frequency signal, first intermediate frequency synthesizing means which generates a first mixing signal, a first mixing means whereby said conditioned radio frequency signal is mixed with said first mixing signal such that a first intermediate frequency signal results, an intermediate frequency crystal filter whereby said first intermediate frequency signal is filtered to eliminate all but one of the four frequencies resulting from said first mixing means, second intermediate frequency synthesizing means having a crystal controlled oscillator whereby a second mixing signal is generated, second mixing means whereby said first intermediate frequency signal is mixed with said second mixing signal resulting in a second intermediate frequency signal, a bipolar filter circuit having a crystal filter whereby said second intermediate frequency signal is filtered such that modulates changes and slight frequency drifts are allowed, a limiter circuit whereby gain uniformity and amplification of said second intermediate frequency signal is provided, a discriminator circuit whereby said secondary intermediate frequency signal is demodulated and converted into a demodulated data audio output, and a demodulated data audio decoder whereby said demodulated data audio output is decoded such that if said unique audio encoded data signature is detected a voltage output is produced[.] *and*

[e)] *c*) alarm producing means having a demodulated data switch such that when said voltage output is produced by said demodulated data audio decoder, said demodulated data switch responds to said voltage output and actuates said alarm [warning the driver of said motor vehicle of the approach of said emergency vehicle.]

2. The system of claim 1 wherein said radio frequency signal has a frequency of at least about 780 MHz.

3. The system of claim 1 wherein said radio frequency signal has arrange of at most about 3500 feet.

4. The system of claim 1 further comprising a radio [in said motor vehicle] whereby said alarm is incorporated into said radio such that said radio is turned down or off when said voltage output is produced.

5. The system of claim 1 wherein said frequency synthesizing means is a phase locked loop circuit with a voltage controlled oscillator.

6. The system of claim 1 wherein said frequency synthesizing means is a crystal oscillator multiplier type.

7. The system of claim 1 wherein said second intermediate frequency signal has a frequency of about 455 KHz.

* * * * *